June 29, 1926.
S. R. RAMSAY
1,590,549
INCUBATOR
Filed Nov. 19, 1924
2 Sheets-Sheet 1
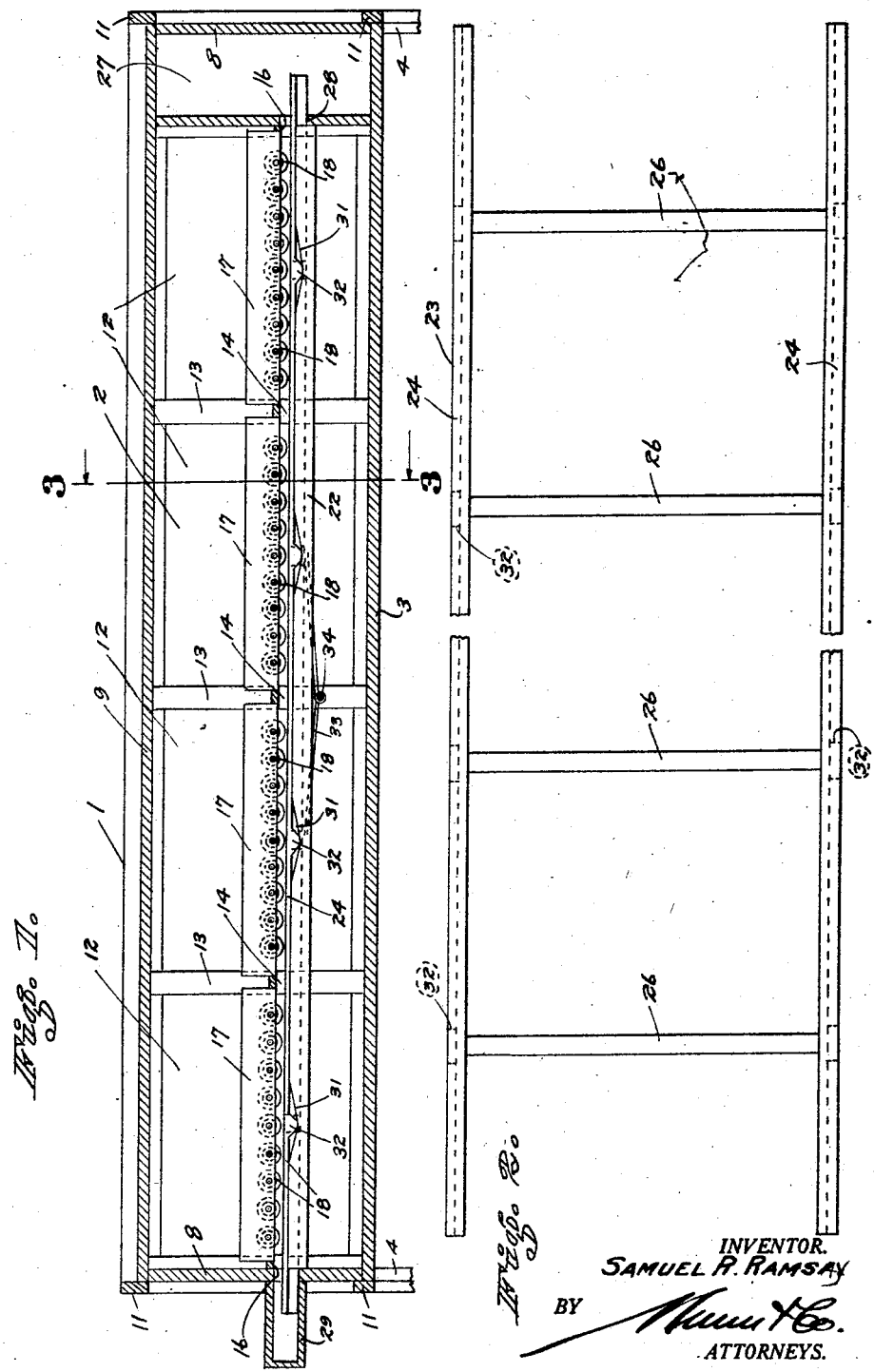
INVENTOR.
SAMUEL R. RAMSAY
BY
ATTORNEYS.

June 29, 1926.
S. R. RAMSAY
INCUBATOR
Filed Nov. 19, 1924      2 Sheets-Sheet 2
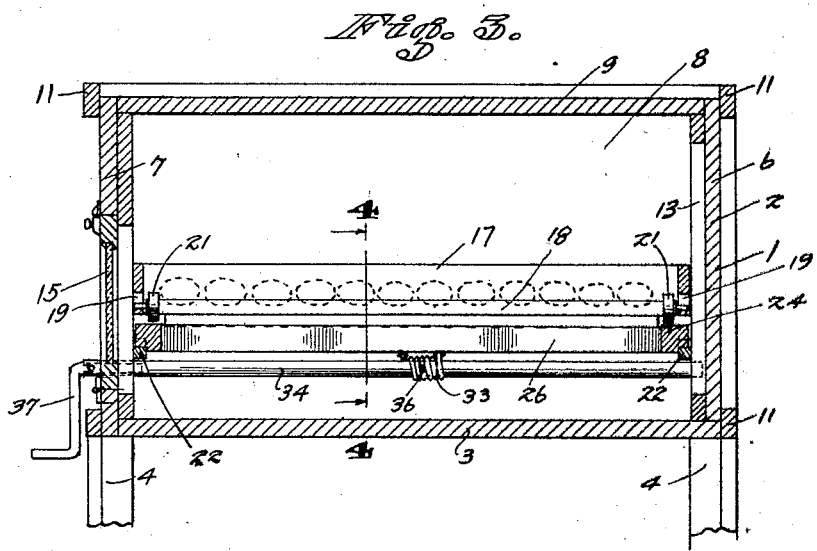
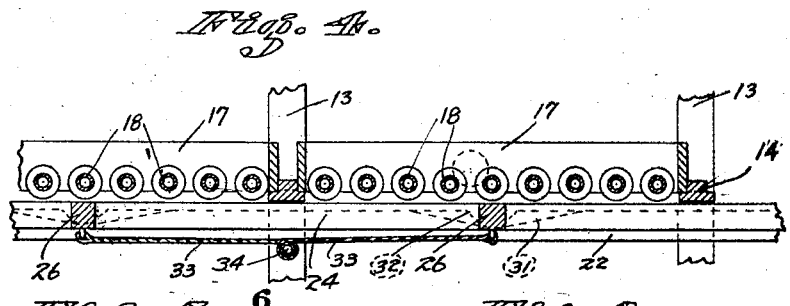
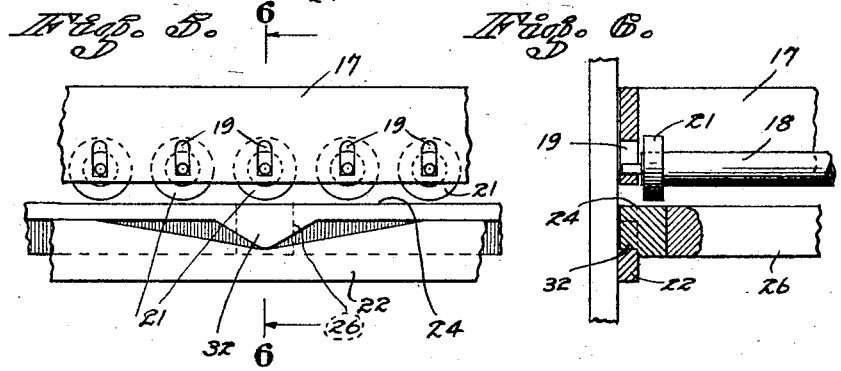
INVENTOR.
SAMUEL R. RAMSAY
BY
ATTORNEYS.

Patented June 29, 1926.

1,590,549

UNITED STATES PATENT OFFICE.

SAMUEL R. RAMSAY, OF SANTA CRUZ, CALIFORNIA.

INCUBATOR.

Application filed November 19, 1924. Serial No. 750,895.

The present invention relates to improvements in incubators and has particular reference to a means for turning the eggs in an incubator. When eggs are hatched in an incubator, it is necessary that they be turned periodically, preferably twice every twenty-four hours, and this turning has to be done very carefully to avoid shaking and knocking of the eggs which is apt to kill the germ of the developing chick. Turning eggs in an incubator by hand is a very slow process and implies considerable expense for labor. Many schemes have been devised for facilitating the turning of the eggs, but apparently none have been successful due particularly to the fact that in most cases when eggs are turned otherwise than by hand the turning device causes undue vibration of the eggs with the injurious results previously mentioned.

It is proposed in the present invention to provide a means whereby all the eggs contained in an incubator may be turned in a single operation without, in any way, endangering the life of the germ or the little chick.

My device designed for this purpose is very simple, cheap to manufacture, and may be easily installed in any standard incubator now on the market. It has the further advantage that the actuating means do not interfere in any way with the insertion and removal of the trays supporting the eggs, since the actuating means is made to disappear when not used.

Further objects and advantages of my device will appear as the specification proceeds.

The preferred form of my invention is illustrated in the accompanying drawing, in which Figure 1 shows a longitudinal section through an incubator having my device attached thereto, taken immediately adjacent the front wall thereof.

Figure 2 is a detail view in plan of a sliding frame used in my device.

Figure 3 a section taken along line III—III of Figure 1.

Figure 4 a section taken along line IV—IV of Figure 3.

Figure 5 an enlarged detail view illustrating the principal feature of the invention, and Figure 6 a section taken along line VI—VI of Figure 5.

While I have shown only the preferred form of the invention, I wish to have it understood that various changes or modifications may be made within the scope of the claims hereto attached without departing from the spirit of the invention.

The incubator 1 may be of standard make and preferably comprises a long rectangular box 2 including a base 3 resting on the legs 4, a rear wall 6, a front wall 7, end walls 8, and a cover 9. A system of battens 11 may surround the edges of the boxes or housing in the manner shown in the drawing.

The housing is divided into a number of compartments 12 which freely communicate with one another by means of frames 13 supporting, at a distance from the floor or base 3, a plurality of ledges 14 which in cooperation with corresponding ledges 16 secured to the end walls of the box form slides on which the trays 17 may be received, the ledges 14 and 16 being all in the same plane. Hinged doors 15 in the front wall give access to the compartments.

The trays comprise rectangular frames preferably made of four strips of wood and support between two opposing frame elements a plurality of rolls 18 arranged in parallel relation, the rolls riding in slots 19 in the frame elements so as to be capable of vertical motion. When the trays are arranged in the box or housing of the incubator, the rolls extend substantially from the front wall to the rear wall, that is, longitudinally of the incubator. The rolls are spaced sufficiently to allow eggs to be supported between each two of them without causing the eggs of one row to contact with the eggs of the next adjoining row. Each roll is provided near its end with a collar 21 of somewhat larger diameter.

Underneath the ledges which support the trays there are mounted along the front and rear walls of the incubator housing two stationary transverse rails 22 adapted to allow the transverse frame 23, illustrated in Figure 2, to ride thereon. The latter frame consists of two parallel rails 24 connected by a number of bars 26, the two rails being preferably slightly longer than the tray accommodating part of the incubator housing so that the ends extend through the end walls of the housing and are slidable therein. One of the ends extends into a heating chamber 27 and no particular provision is made for preventing air to enter through the holes 28 necessitated for accommodation of the ends of the frame. At the other end a small protecting case 29 is preferably provided to prevent entrance of atmospheric air through the corresponding holes.

The stationary rails 22 are formed preferably in the center of each compartment with depressions 31 presenting slanting faces rising from the bottom of each depression in opposite directions and the sliding rails 24 are provided with downwardly extending projections 32 corresponding in their relative position to the depressions 31. The projections are made to allow the sliding rails to lie throughout their length on the stationary rails when they are disposed centrally relative to the depressions 31, and when the rails are in this position they are out of contact with the collars 21 of the rolls 18 but in the vertical planes of the collars. When the frame 23 containing the sliding rails 24 is moved endwise in either direction, the projections 32 ascend the slanting faces of the depressions 31 and cause the entire frame to be raised while maintaining a horizontal position, the end portions of the ledges 14 being cut away to accommodate the rising frame 23. This causes the rails 24 to first come in contact with the collars 21 of the rolls and on a continuation of the endwise motion to raise the rolls in the slots 19 so that the rails assume the entire weight of the rolls and revolve the latter at exactly the same speed as the motion is continued. The revolving of all the rolls by a single operation causes the eggs to turn evenly without vibration or shaking.

Endwise motion is imparted to the frame 23 by means of a cable 33 wound on a shaft 34 supported in the front and rear walls of the incubator. A central part of the cable is fastened to the shaft 34, as shown at 36, and the two ends are fastened to two adjacent connecting members 26 of the frame 23 so that when the shaft is turned in one direction or the other corresponding endwise motion is imparted to the frame. Turning of the shaft is effected by means of a crank handle 37 disposed on the outside of the incubator.

The operation of my device is readily understood from the foregoing description. The eggs are placed on the rolls of the trays and the trays slid into the incubator on the ledges 14 and 16 respectively. To effect a turning of the eggs, it is only necessary to turn the crank handle 37 which imparts endwise motion to the frame 23 and causes its rails 24 which normally are out of contact with the collars 21 to rise, to engage with the collars and to then raise the same and to simultaneously revolve them, whereby all the eggs are turned at one time. The frame remains in its elevated position until it is again necessary to turn the eggs. Then the crank is turned in the opposite direction and the projections of the rails move endwise from one side of the depression to the other side of the depression, first lowering the collars 21 while imparting rotary motion to the same, then gradually losing contact with the collars while passing over the deepest portion of the depression and then renewing their engagement while ascending the other side for finishing the turning movement. When it is desired to remove the trays, the crank handle is turned until the projections 32 reach a central position relative to the depression 31 which causes the rails 24 to lose contact with the collars 21 so that the tray may now easily be removed since the rails are out of the way of the collars.

It should be pointed out as one of the great advantages of my device that the trays are interchangeable and reversible, that is, any one of the trays may be used for any one of the compartments and may be turned end for end in its compartment without interfering with the operation of my mechanism.

I claim:

1. In an incubator, a tray frame having horizontal rolls mounted therein in parallel relation and with freedom of vertical motion, supporting means for the frame and rails arranged below the frame with freedom of endwise motion having means associated therewith for raising the rails into lifting contact with the rolls when moved endwise for turning the rolls.

2. In an incubator, a tray frame having horizontal rolls mounted therein in parallel relation and with freedom of vertical motion, supporting means for the frame, rails arranged below the frame with freedom of endwise motion having projections extending downwardly therefrom and an inclined plane allowing the projection to ride thereon for raising the rail into lifting contact with the rolls when the rail is moved endwise for turning the roll.

3. In an incubator, a tray frame having horizontal rolls mounted therein in parallel relation, supporting means for the frame and rails arranged below the frame with freedom of endwise motion having means associated therewith for raising the same into operative contact with the rolls when moved endwise for turning the rolls.

4. In an incubator, a tray frame having horizontal rolls mounted thereon in parallel relation, supporting means for the frame and a rail arranged below the frame with freedom of endwise motion having means associated therewith for effecting operative contact of the same with the rolls.

5. In an incubator, a housing, sets of longitudinal ledges arranged therein in a horizontal plane, trays adapted to be slidably received on said ledges, parallel rolls in each tray adapted to support eggs between the same and mounted with freedom of vertical sliding motion, transversely disposed horizontal sliding rails mounted underneath the rolls so as to normally remain out of contact with the same, means for imparting endwise motion to the rails and means for causing the rails to project upwardly when actuated and to thereby assume the weight of the rolls so as to revolve the same when the endwise motion is continued.

6. In an incubator, a housing, sets of longitudinal ledges arranged therein in a horizontal plane, trays adapted to be slidably received on said ledges, parallel rolls in each tray adapted to support eggs between the same and mounted with freedom of vertical sliding motion, transversely disposed horizontal sliding rails mounted underneath the rolls so as to normally remain out of contact with the same, and means for imparting endwise motion to the rails, the rails being made to ascend slanting surfaces while moving endwise whereby they are raised without changing their horizontal position for engaging and revolving the rolls.

7. In an incubator, a housing, sets of longitudinal ledges arranged therein in a horizontal plane, trays adapted to be slidably received on said ledges, parallel rolls in each tray adapted to support eggs between the same, transverse stationary rails mounted below the ledges having depressed sections therein, sliding rails thereon having projections depending therefrom adapted to ride on the depressed sections and normally out of contact with the rolls, and means for imparting endwise motion to the sliding rails causing the projections to ascend the depressed sections so as to engage the sliding rails with the rolls for revolving the same.

8. In an incubator, a housing, sets of longitudinal ledges arranged therein in a horizontal plane, trays adapted to be slidably received on said ledges, parallel rolls in each tray adapted to support eggs between the same and mounted with freedom of vertical motion, transverse stationary rails mounted below the ledges having depressed sections therein, sliding rails thereon having projections depending therefrom adapted to ride on the depressed sections and normally out of contact with the rolls, and means for imparting endwise motion to the sliding rails causing the projections to ascend the depressed sections so as to engage the sliding rails with the rolls whereby the former raise the latter and revolve the same.

9. In an incubator, a tray frame having horizontal rolls mounted thereon in parallel relation and with freedom of vertical motion, supporting means for the frame and a rail arranged below the frame with freedom of endwise motion having means associated therewith for relatively raising the rail into contact with the rolls when moved endwise for turning the rolls.

SAMUEL R. RAMSAY.